US005945921A

United States Patent [19]

Seo et al.

[11] Patent Number: 5,945,921

[45] **Date of Patent: *Aug. 31, 1999**

[54] APPARATUS AND METHOD FOR CONFIRMING REMOTE CONTROL COMMAND RESPONSE

[75] Inventors: Seong-Jun Seo; In-Taek Jeon, both of Suwon, Rep. of Korea

[73] Assignee: Samsung Electronics Co., Ltd., Kyungki-do, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 08/508,688

[22] Filed: Jul. 28, 1995

[30] Foreign Application Priority Data

Jul. 28, 1994 [KR] Rep. of Korea .................. 1994-18480

[51] Int. Cl.$^{6}$ ................................ H04B 9/00; H04Q 1/00

[52] U.S. Cl. ................................ 340/825.69; 340/825.72; 340/825.22; 348/734; 359/142; 359/148

[58] Field of Search ......................... 340/825.69, 825.72, 340/825.24, 825.25, 825.22; 348/734; 235/375, 383; 359/142, 148

[56] References Cited

U.S. PATENT DOCUMENTS 4,728,949 3/1988 Platte et al. ........................ 340/825.37
4,764,981 8/1988 Miyahara et al. ....................... 455/603
5,488,357 1/1996 Sato et al. .......................... 340/825.25
5,537,106 7/1996 Mitsuhashi ......................... 340/825.72
5,565,857 10/1996 Lee .................................... 340/825.34

*Primary Examiner*—William A. Cuchlinski, Jr.
*Assistant Examiner*—Y. Beaulieu
*Attorney, Agent, or Firm*—Sughrue, Mion, Zinn, Macpeak & Seas, PLLC

[57] ABSTRACT

A remote control command response confirming apparatus which includes a remote control command reception device for performing an operation corresponding to a received command signal in response to reception of a first remote control command signal, and for transmitting a second remote control command signal in response to the received remote control command signal. The apparatus also includes a remote controller having at least one or more operable function keys and an light emitting diode (LED) lamp for each function key, for transmitting to the remote control command reception device, the first control command signal according a selected function key, and for turning off the lamp corresponding to the key in response to reception of the second remote control command signal.

16 Claims, 2 Drawing Sheets

APPARATUS AND METHOD FOR CONFIRMING REMOTE CONTROL COMMAND RESPONSE

BACKGROUND OF THE INVENTION

1. Field of the Invention

The present invention relates to a remote controller and a remote control command reception apparatus which responds to the reception of a remote control command signal transmitted from the remote controller, and then performs a corresponding operation. More particularly, the present invention relates to an apparatus and a method for confirming whether the remote control command reception apparatus accurately receives the remote control command signal transmitted from the remote controller.

The present application for confirming a remote control command response is based on Korean Application No. 94-18480 which is incorporated herein by reference for all purposes.

2. Discussion of Related Art

In general, a remote controller remotely controls an electronic machine separated relative to the remote controller. Such a remote controller is widely used in household electric appliances. Also, a remote controlling method is employed to transmit, in a one-way direction, a remote control command signal i.e., a remote control code, based on a selection made by a user, to the remote control command reception apparatus, where the remote control command reception apparatus is a remotely controlled object. Such conventional controllers and methods will be understood through the following description.

The remote control command signal is a remote control signal output from a known remote controller. The remote control command signal preferably is an infrared pulse signal, which includes a system code and a custom code.

FIG. 1 is a block diagram showing a conventional remote controller and a remote control command reception apparatus. A remote control command reception apparatus receives a remote control command signal externally transmitted, and hence, performs an operation corresponding to the received remote control command signal. Further, a remote controller 14, which has at least one or more keys, transmits the remote control command signal, based on a selected key, to the remote control command reception apparatus 12.

In FIG. 1, the remote control command reception apparatus 12 includes a receiving unit 16 and an microprocessing unit (MPU) 18. The receiving unit 16, which is separate from remote controller 14, receives the control command signal transmitted as described above, and outputs a photoelectric converted signal. The MPU 18 decodes the remote control command signal received by receiving unit 16 and performs the corresponding function. The remote controller 14 includes a keypad 20, an MPU 22, and a transmitting unit 24. The keypad 20 includes at least one or more keys mounted on the keypad. The MPU 22 detects selection of a key thereby generating a corresponding remote control command signal. The transmitting unit 24 photoelectric-converts the remote control command signal output from MPU 22 into an infrared signal, and transmits the converted signal to receiving unit 16 of remote control command reception apparatus 12.

The effective transmitting distance and transmitting angle (i.e., the angle between the remote controller 14 and the receiving unit 16) of the remote control command signal transmitted to the remote control command reception apparatus 12 from the remote controller 14, are shown in FIG. 2. Referring to FIG. 2, a symbol "T" indicates a distance at which the remote control command signal transmitted from the remote controller 14 is effectively transmitted to the remote control command reception apparatus 12. Transmitting angles are indicated as $\alpha$ and $\beta$. The preferred effective transmitting distance is changed depending to a characteristic of the infrared diode used in the remote controller 14 and a transmitting output state. However, the effective transmitting distance is generally about 5 m to 7 m. Furthermore, the effective transmitting angle has an effective range of about 45° to 90° degrees about the right and left sides of remote controller 14.

Operation of the apparatus as shown FIG. 1 is explained with reference to FIG. 2, as follows.

In order for a user to remotely control the operation of the remote control command reception apparatus 12, the user must select a key corresponding to a particular operation, which is located on keypad 20 of the remote controller 14, causing a selection key signal to be input to MPU 22. The MPU 22 generates the remote control command signal corresponding to the input key signal to thereby output the signal via an output terminal, to transmitting unit 24. The remote control command signal generated by MPU 22 should preferably be an infrared signal that includes a system code and a custom code. Further, the remote control command signal can equally as well use a general remote controller transmitting format. The transmitting unit 24 inputs the remote control command signal output by MPU 22, and electric-photo converts the received remote control command signal to thereby emit the electric-photo converted signal. That is, transmitting unit 24 electric-photo converts the remote control command signal output from MPU 22 into an infrared light signal to thereby transmit the converted signal through space.

As shown in FIG. 2, since an output of remote controller 14 has a directional characteristic, in general the user should direct emission of the source of light toward receiving unit 16 of the remote control command reception apparatus 12. Accordingly, the remote control command signal transmitted from transmitting unit 24 of remote controller 14 is transmitted to remote control command reception apparatus 12, which can be separated from remote controller 14 by a predetermined distance T. The receiving unit 16 of remote control command reception apparatus 12 photoelectric converts the remote control command signal received as a light signal to thereby input the converted signal to MPU 18 as a logic signal.

The MPU 18 of remote control coammand reception apparatus 12 analyzes the remote control command signal output from receiving unit 16 as digital data to thereby output a control signal to a corresponding functional component of the apparatus (not shown) through a control bus 21, the control signal being capable of initiating performance of a function corresponding to the analyzed signal. Hence, the conventional remote control command reception apparatus 12, constructed as shown in FIG. 1, must be positioned with respect to the remote controller 14 to thus perform an operation corresponding to the selected key of keypad 20.

However, according to the conventional remote controller of FIG. 1, in the case where a user controls an operable mode of remote control command reception apparatus 12 which is disposed in a position away from remote controller 14, by using a key on remote controller 14, there arises a problem in that it is difficult to confirm whether or not the remote control command reception apparatus 12 performs the operation. For example, operation of remote control command reception apparatus 12 may not be apparent to the naked eye. Moreover, in the case of remotely controlling a camcorder, i.e., a video camera recorder, such a problem becomes serious because the camcorder has many operable modes which are not visually confirmed over a remote distance. For example, modes such as or starting, zooming, interval recording, shutter mode, and title mode, are such modes.

Therefore, if, for example remote control command reception apparatus 12 of FIG. 1 is a camcorder, and in the case where a user takes a photograph of oneself in a movable field by using the remote controller 14, it is difficult to confirm whether the camcorder correctly operates in a photographing mode. Such a problem becomes more serious in the case of a remote control operation of a camcorder, being the remote control command reception apparatus 12, in the movable field by using the remote controller 14. Accordingly, in the case of remote control devices such as a camcorder, the user should stand within the distance T and the control angle, as shown in FIG. 2, which limits the range of operation by the user.

SUMMARY OF THE INVENTION

It is therefore object of the present invention to provide an apparatus and a method capable of easily confirming a remote control of a remote control reception apparatus such that a user's freedom of motion is not unduly limited.

It is another object of the present invention to provide a remote control command response confirming apparatus and a method for confirming a remote control state of a control object located at a distance away from a remote controller.

The remote control reception apparatus according to the present invention having the above objects includes a remote control command reception device for performing an operation in response to reception of a first remote control command signal and transmitting a second remote control command signal in response to the received remote control command signal; and a remote controller having at least one operable function key and a corresponding indicator for transmitting to said remote control command reception device said first control command signal according to selection of said function key and controlling said indicator for said selection key in response to reception of said second remote control command signal.

To accomplish another object of the present invention, a method is provided for confirming a response of a remote control command response confirming apparatus having a remote controller for transmitting a remote control command signal corresponding to selection of a function key on a keypad and for displaying a remote control state by driving an indicator for indicating reception of a response command signal, and a remote control reception device for performing an operation corresponding to the received remote control command signal and transmitting said response command signal to said remote controller, said method comprising the steps of:

(a) outputting a remote control command signal corresponding to a key selected by a user from the remote controller;

(b) outputting a remote control command response signal from the remote control reception device, in response to receipt of said remote control command signal; and (c) driving the indicator corresponding to said selected key in response to reception of the response command signal.

BRIEF DESCRIPTION OF THE DRAWINGS

The above and other objects, advantages and features of the present invention will be more apparent from the following detailed description taken with the attached drawings, in which.

DETAILED DESCRIPTION OF THE PREFERRED EMBODIMENT

Figure 3:
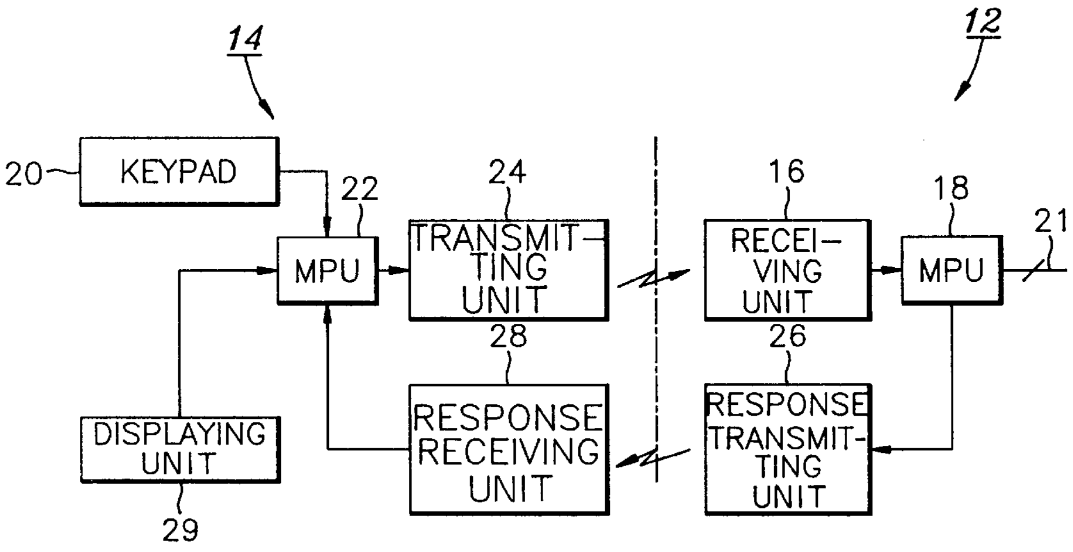
FIG. 3 is a block diagram showing a remote controller and a remote control command reception apparatus according to the present invention.

FIG. 3 is a block diagram showing a remote controller and a remote control command reception apparatus according to the present invention. The remote control command reception apparatus shown in FIG. 3 includes a response transmitting unit 26 in addition to the construction of the remote control command reception apparatus 12 of FIG. 1. The response transmitting unit 26 electric-photo converts and transmits a response command signal under control of an MPU 18. The remainder of the construction of the remote control command reception apparatus of FIG. 3 is the same as that shown in FIG. 1.

Figure 1:
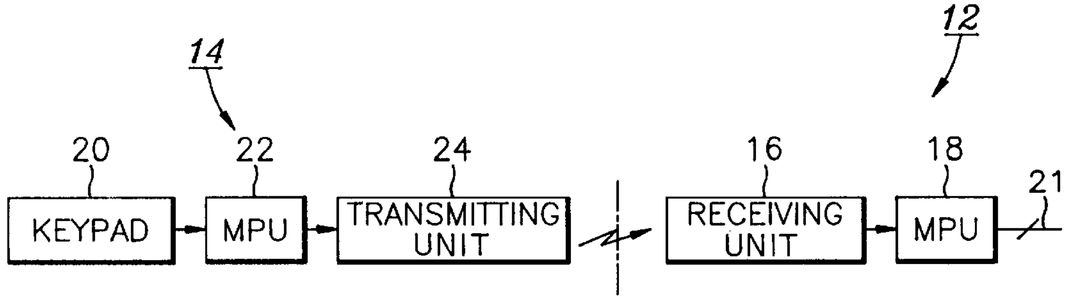
FIG. 1 PRIOR ART
FIG. 1 is a block diagram showing a conventional remote controller and a remote control command reception apparatus.
Figure 2:
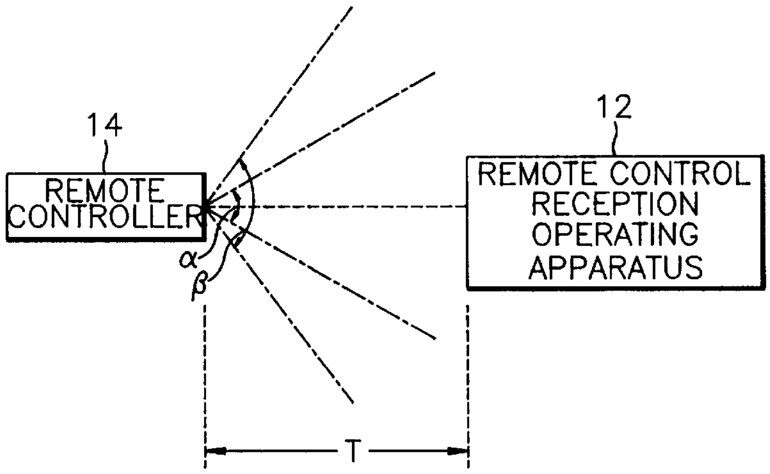
FIG. 2 PRIOR ART
FIG. 2 is a characteristic diagram showing an effective range of operation of a remote controller.

The remote controller shown in FIG. 3 further has a response receiving unit 28 and a displaying unit 29, in addition to the remote controller of FIG. 1. The response receiving unit 28 receives the response command signal transmitted from response transmitting unit 26 of remote control command reception apparatus 12 and outputs the photoelectric converted response data to MPU 22. The displaying unit is connected to an output terminal of MPU 22 to drive a lamp, e.g., a light-emitting diode (LED), corresponding to the displaying data. The remainder of the construction of the remote controller of FIG. 3 is the same as that of the remote controller of FIG. 1. The reason why the additional elements are added in the present invention is that data is transmitted from remote control command reception apparatus 12 to remote controller 14.

In the above figures, MPU 18 includes a memory which has a program generating the response data corresponding to the received remote control command signal. Further, the memory of the MPU 22 has other programs for driving a lamp corresponding to the received response data.

Figure 4:
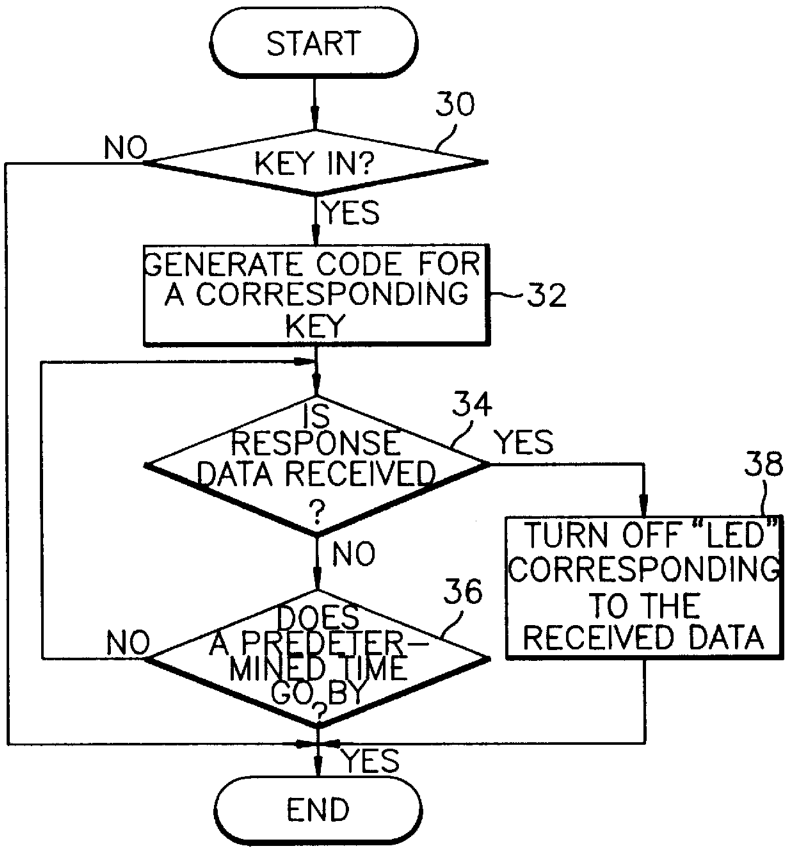
FIG. 4 is a flow chart showing an operation of a remote controller according to the present invention.

FIG. 4 is a flow chart showing an operation of the remote controller according to the present invention, which is comprised of the following steps. In step 32 the remote control command signal (code) is generated for a corresponding key, when the key on keypad 20 is selected in step 30. Step 34 detects whether the response data is received or not. Step 38 turns off the lamp LED corresponding to the received data during reception of the response data, corresponding to the remote control command transmitted in the above detecting step. Step 36 waits a predetermined amount of time before ending, otherwise step 34 is performed.

Figure 5:
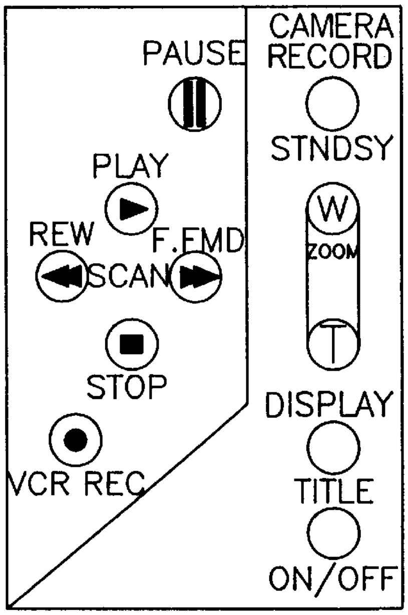
FIG. 5 is a diagram showing a construction of a key panel of a remote controller according to the present invention.

FIG. 5 is a view showing a construction of the key panel of the remote controller according to the present invention, which is a view showing an embodiment of a camcorder.

The lamp LED can be disposed anywhere on the remote controller such that a user can confirm that it corresponds to a particular key. For example, the lamp LED can be located on the lower part of each key of the keypanel shown in FIG. 5. Accordingly, a lamp LED is turned off by control of MPU 22 when the corresponding key is selected.

When the circuit of FIG. 3 is operated, MPU 22, which is part of the remote controller 14, scans keypad 20 to check whether or not a key on keypad 20 is selected. Further, MPU 18, which is part of the remote control command reception apparatus 12, scans the output of receiving unit 16 for a predetermined period of time to detect whether or not the remote control command signal is received.

In order for a user to control the remote control command reception apparatus 12, which is in the state described above, the user selects a specific key on keypad 20, generating a signal corresponding to the selected key. This signal is input to MPU 22. At this time, MPU 22 determines, in step 30 of FIG. 4, that the key input is completed, and in step 32 outputs the remote control command signal (code) corresponding to the selected key, to transmitting unit 24. MPU 22 also checks, in step 34, whether or not the response data corresponding to the remote control command signal is received, by reading a signal output from response receiving unit 28.

The transmitting unit 24 receives the remote control command signal output from MPU 22, and electric-photo converts the input remote control command signal into an infrared signal. At this point, the output direction of the electric-photo converted transmission signal is changed according to the transmitting direction of remote controller 14. However, if remote controller 14 transmits the transmission signal within the effective transmission angle, the transmission signal is transmitted to receiving unit 16 located within the remote control command reception apparatus 12, in accordance with user's intention.

Receiving unit 16 photo-electric converts the remote control command signal to thereby input to MPU 18 photo-electric converted binary data of the remote control command signal. MPU 18 outputs a control signal for performing a function corresponding to the remote control command signal output from receiving unit 16, to a corresponding control block (not shown) through a control bus 21. The control block performs the function corresponding to the input control signal.

In the meantime, MPU 18, which outputs a control signal corresponding to the remote control command signal output to control bus 21, outputs a response command signal having the same code as the received remote control command signal, to response transmitting unit 26. That is, MPU 18 outputs the control signal corresponding to the remote control command signal received from receiving unit 16, and also outputs the response command signal having the same code as that of the received remote control command signal. The response transmitting unit 26 electric-photo converts the response command signal output from MPU 18. The response command signal, which is electric-photo converted, is transmitted to response receiving unit 28 of remote controller 14.

The response receiving unit 28 of remote controller 14 photoelectric converts the response command signal output from response transmitting unit 26 of remote control command reception apparatus 12 to thereby output the photo-electric converted binary data to MPU 22. Here, MPU 22, performing step 34 of FIG. 4, determines that the response data has been received and therefore, turns off the LED lamp corresponding to the data received condition of step 38. The data relating to the response command signal is the same as that of the remote control command signal transmitted from remote controller 14. Thus, MPU 22 drives the lamp arranged in the lower part of the key for executing the remote control command.

As described in the aforementioned operation, the remote control command reception apparatus 12 transmits to remote controller 14 the same response command as the remote control command received through the response transmitting unit 26 during reception of the remote control command. The remote controller 14 turns off the lamp of the key corresponding to the received remote control command. Therefore, the user can easily confirm at even a remote distance, whether or not the command corresponding to the selected key is executed, because the lamp positioned in the lower part of the key on the keypad is turned off in response to receiving the response command of remote control command reception apparatus 12.

As discussed above, the present invention adds the data transmitting and receiving unit, for transmitting and receiving data, to the remote controller and the remote control command reception apparatus. By employing the added data transmitting and receiving units, the present invention transmits and receives the data reception confirmation command, and also is able to check and display whether the remote command is executed or not, so that it is possible for a user to easily determine whether or not the remote control operation is performed. Further, with such a confirmation operation, it is possible to confirm whether or not the remote control is performed, thereby enabling the user to correctly perform a remote control operation.

What is claimed is:

1. A remote control command response confirming apparatus comprising:

a remote control command reception device for performing an operation in response to reception of a first remote control command signal and transmitting a second remote control command signal in response to the received remote control command signal; and a remote controller having an operable function key and an indicator for transmitting to said remote control command reception device said first control command signal according to selection of said function key and controlling said indicator for said function key in response to reception of said second remote control command signal; and wherein said second remote control command signal is identical to said first remote control command signal, and wherein if the second remote control command signal is received by the remote controller the indicator is controlled to indicate that the remote control command reception device has accurately received the first remote control command signal.

2. The remote control command response confirming apparatus as claimed in claim 1, wherein said indicator is arranged in a lower part of said function key.

3. The remote control command response confirming apparatus as claimed in claim 2, wherein said indicator is an LED lamp.

4. The remote control command response confirming apparatus as claimed in claim 3, wherein said indicator is controlled to turn off said LED lamp in response to reception of said second remote control command signal.

5. A remote control command response confirming apparatus comprising:

a remote control command reception device comprising:
a receiving unit for receiving a remote control command signal, and for converting said remote control command signal into an electrical remote control command signal; and
a first controller unit for receiving said electrical remote control command signal, and outputting a second remote control command signal to an operating device, and for outputting a response command signal, wherein said second remote control command signal and said response command signal are both based on said electrical remote control command signal; and
a response transmitting unit for receiving said response command signal from said first controller unit, converting said response command signal to a transmission response command signal based on said remote control command signal, and transmitting said transmission response command signal; and
a remote controller comprising:
a transmitting unit for converting said remote control command signal, and for transmitting a converted remote control command signal to said receiving unit of said remote control command reception device;
a response receiving unit for receiving said transmission response command signal from said response transmitting unit, converting said transmission response command signal into response data, and outputting said response data to a second controller unit, wherein data of said response command signal is identical to data of said remote control command signal transmitted from the remote controller; and
an indicator indicating, in response to a response command signal generated by said second controller, accurate reception of said electrical remote controller command signal by the first controller unit.

6. A remote control command response confirming apparatus of claim 5, further comprising a control input unit having at least one key.

7. A remote control command response confirming apparatus of claim 6, wherein said key is used to generate a particular remote control command signal.

8. A remote control command response confirming apparatus of claim 6, wherein said key contains a light-emitting diode that is turned off when said response data indicates that a remote control command is accurately received.

9. A remote control command response confirming apparatus as recited in claim 6, wherein said second controller unit scans said control input unit to determine whether a key of said control input unit has been selected.

10. A remote control command response confirming apparatus as recited in claim 5, wherein said second controller unit determines whether response data corresponding to said remote control command signal has been received by reading a signal output from the response receiving unit.

11. A remote control command response confirming apparatus as recited in claim 5, wherein said second controller unit includes a program for driving a light-emitting diode in response to said response data from said response receiving unit.

12. A remote control command response confirming apparatus as recited in claim 11, wherein said program turns off said light-emitting diode when the response command signal is received.

13. A remote control command response confirming apparatus as recited in claim 5, wherein said first controller unit includes a memory which includes a program for generating response data corresponding to said received remote control command signal.

14. A remote control command response confirming apparatus as recited in claim 5, wherein said first controller unit scans the output of said receiving unit to detect whether the remote control command signal is received.

15. A remote control command response confirming apparatus as recited in claim 5, wherein said response command signal is identical to said remote control command signal from said first controller unit.

16. A method for confirming a response of a remote control response confirming apparatus having a remote controller for transmitting a remote control command signal corresponding to selection of a function key on a keypad and for displaying a remote control state by driving an indicator for indicating reception of a response command signal, and a remote control reception device for performing an operation corresponding to the received remote control command signal and transmitting said response command signal to said remote controller, said method comprising:
(a) outputting a remote control command signal corresponding to a key selected by a user from the remote controller;
(b) outputting a remote control command response signal from the remote control reception device, in response to receipt of said remote control command signal, wherein the remote control command response signal is identical to the remote control command signal; and
(c) driving the indicator corresponding to said selected key in response to reception of the response command signal, to indicate the remote control reception device accurately received the remote control command signal.

* * * * *